United States Patent [19]

Plozner

[11] Patent Number: 4,920,330
[45] Date of Patent: Apr. 24, 1990

[54] MERCURY INERTIAL TRANSDUCER AND LIGHT-EMITTING INDICATOR FOR MOTOR VEHICLES

[75] Inventor: Lisio Plozner, Pordenone, Italy
[73] Assignee: B.P.T. S.p.A., Venice, Italy
[21] Appl. No.: 220,149
[22] Filed: Jul. 18, 1988
[30] Foreign Application Priority Data

Jul. 16, 1987 [IT] Italy .................. 67614 A/87

[51] Int. Cl.$^5$ .................. B60Q 1/50; H01H 35/02
[52] U.S. Cl. .................. 340/467; 340/463; 340/464; 340/479; 200/61.45 R; 200/61.52; 200/61.47
[58] Field of Search .................. 340/71, 72, 87, 463, 340/464, 466, 467, 468, 471, 478, 479, 669; 200/61.47, 61.45 R, 61.45 M, 61.52

[56] References Cited

U.S. PATENT DOCUMENTS

| | | | |
|---|---|---|---|
| 2,108,791 | 2/1938 | Alden | 200/61.47 |
| 2,823,367 | 2/1958 | Huron | 200/61.47 |
| 3,157,854 | 11/1964 | Riley | 340/71 |
| 3,320,586 | 5/1967 | Wagner | 340/66 |
| 3,622,980 | 11/1971 | Elledge, Jr. | 340/87 |
| 3,739,191 | 6/1973 | Nagazumi et al. | 340/669 |
| 3,973,092 | 8/1976 | Breed et al. | 200/61.47 |
| 4,107,647 | 8/1978 | Yoshino | 340/669 |
| 4,275,378 | 6/1981 | Henderson | 200/61.45 R |
| 4,303,906 | 12/1981 | Weakley | 340/669 |
| 4,574,269 | 3/1986 | Miller | 340/87 |
| 4,682,146 | 7/1987 | Friedman, III | 340/72 |
| 4,700,277 | 11/1987 | Moore | 340/87 |

Primary Examiner—Donnie L. Crosland
Attorney, Agent, or Firm—Sughrue, Mion, Zinn, Macpeak & Seas

[57] ABSTRACT

A mercury inertial transducer includes a casing which defines an essentially L-shaped cavity having a substantially horizontal lower arm and a substantially vertical ascending arm; a volume of mercury which, in the rest condition, occupies the lower arm and essentially does not occupy the ascending arm; an input electrode which penetrates the lower arm from the outside and is permanently immersed in the mercury, and a series of separate output electrodes which are spaced along the ascending arm and can be reached in succession by the mercury when it rises in the ascending arm due to an inertial force directed along the lower arm towards the ascending arm. The transducer may be incorporated in a unit including a support which can be fixed to a movable object, such as a motor vehicle, and on which the transducer is mounted so that the inclination of its lower arm to the horizontal and of its ascending arm to the vertical can be adjusted. The transducer may also be incorporated in a deceleration and stopping indicator including an elongate hollow body provided with means for fixing to the bodywork of a motor vehicle and carrying an array of electrical light units spaced along its length. These light units are aligned transverse the vehicle and face rearwardly with respect to the direction of travel. The inertial transducer is mounted in the hollow body and its output electrodes are each connected to at least one of the light units.

22 Claims, 5 Drawing Sheets

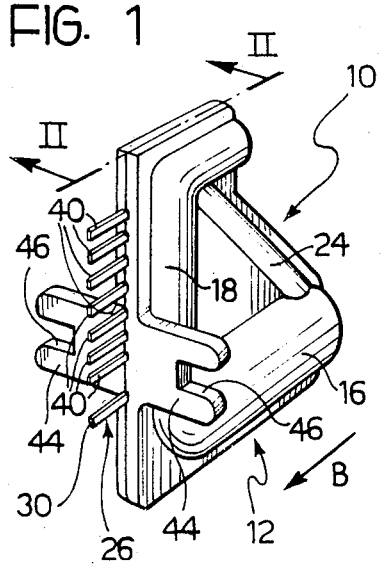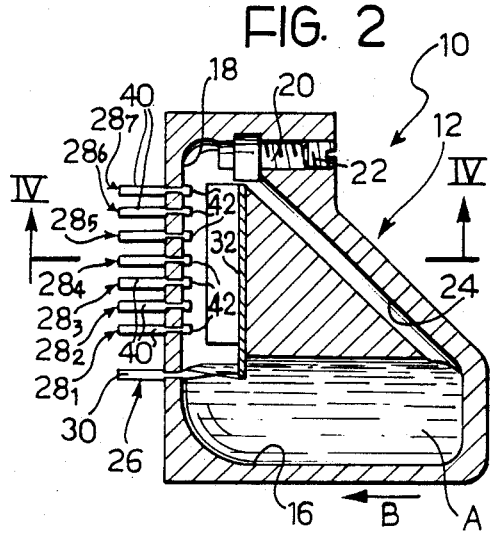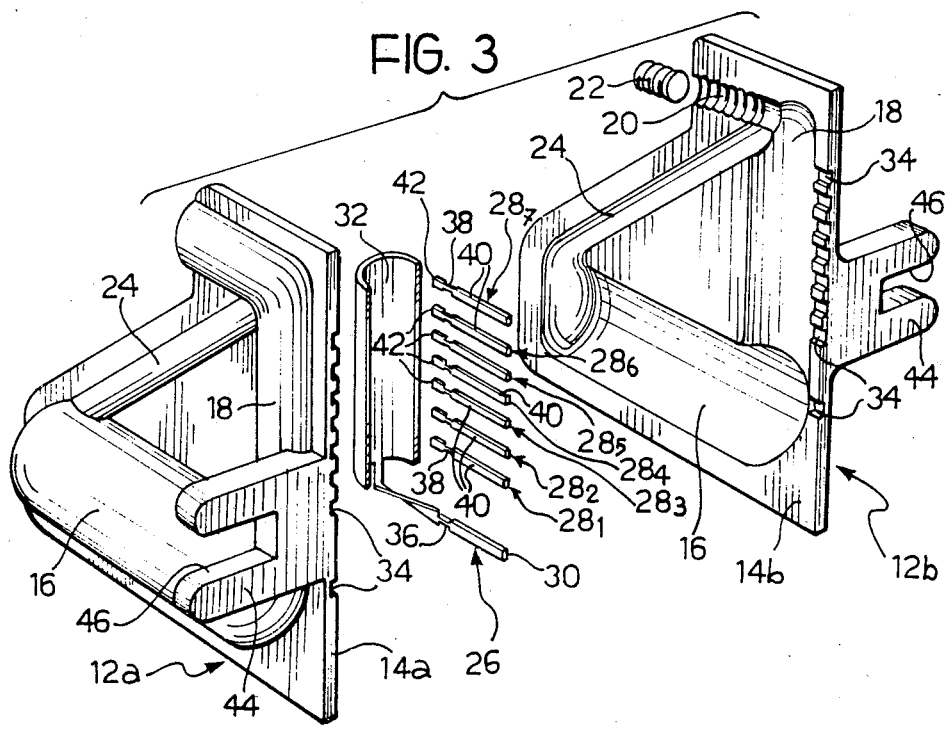

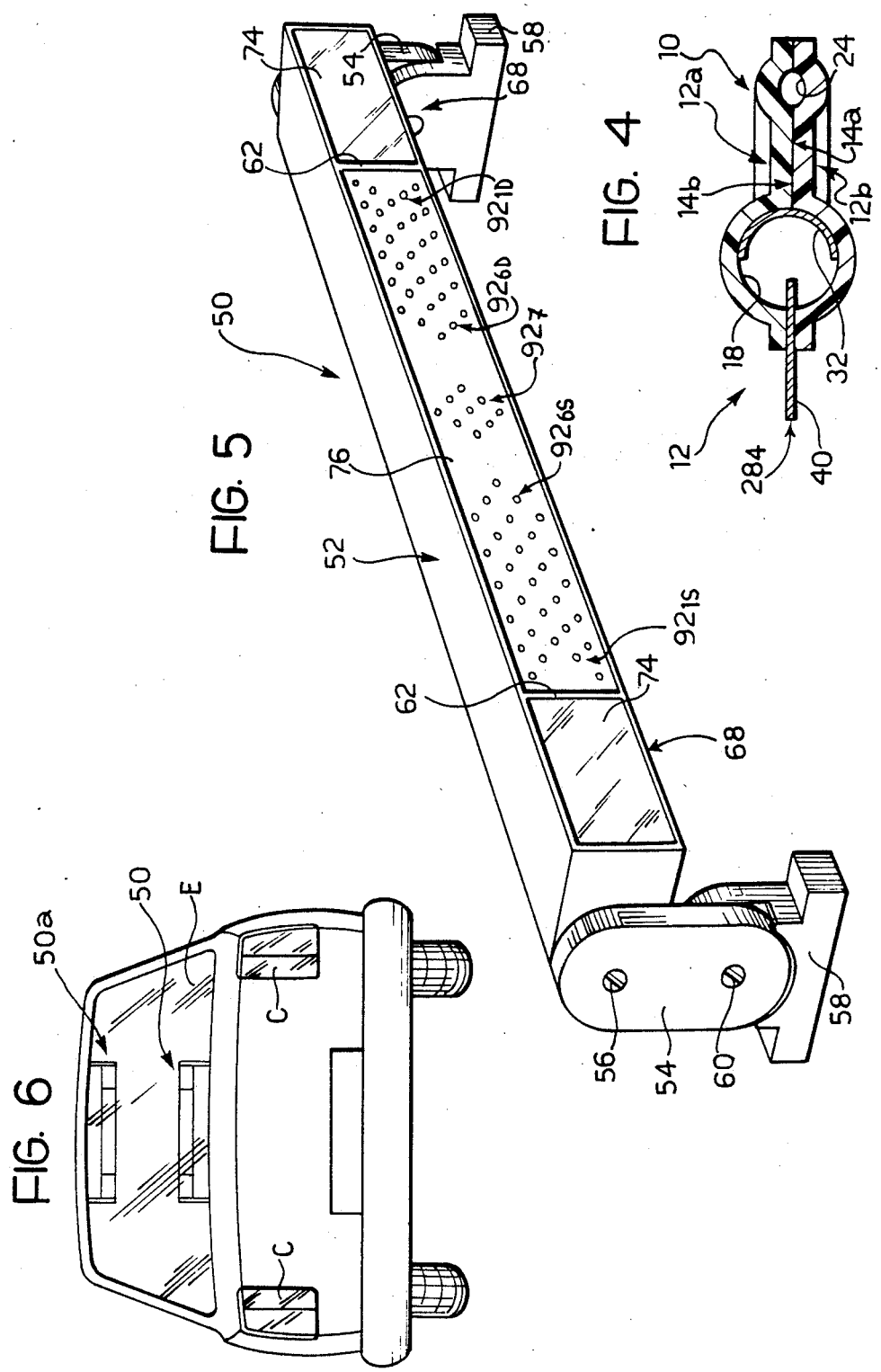

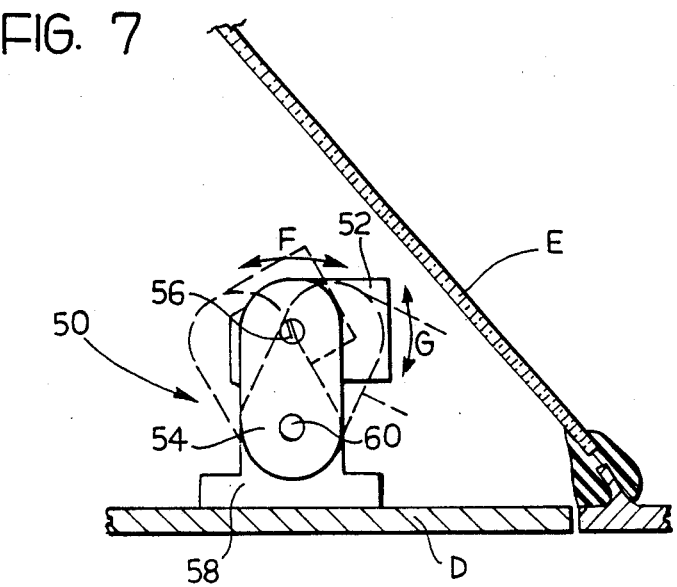
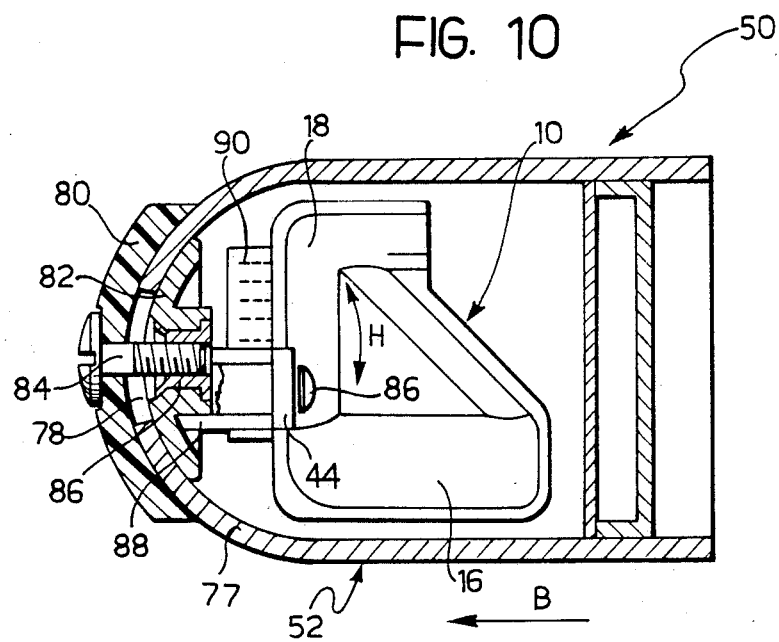

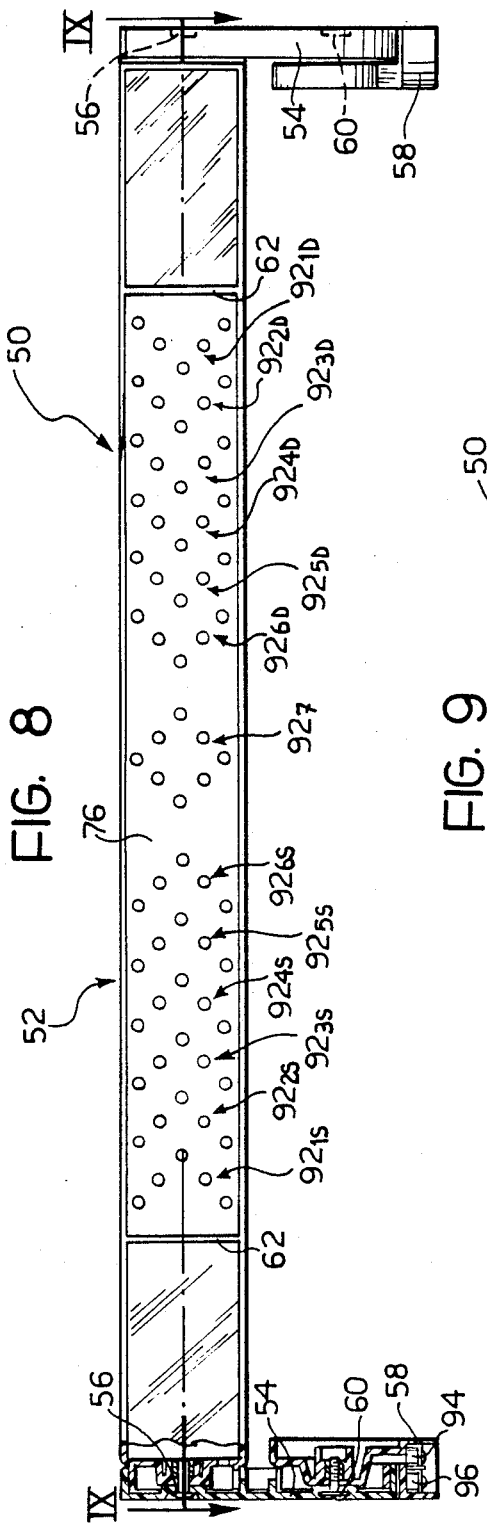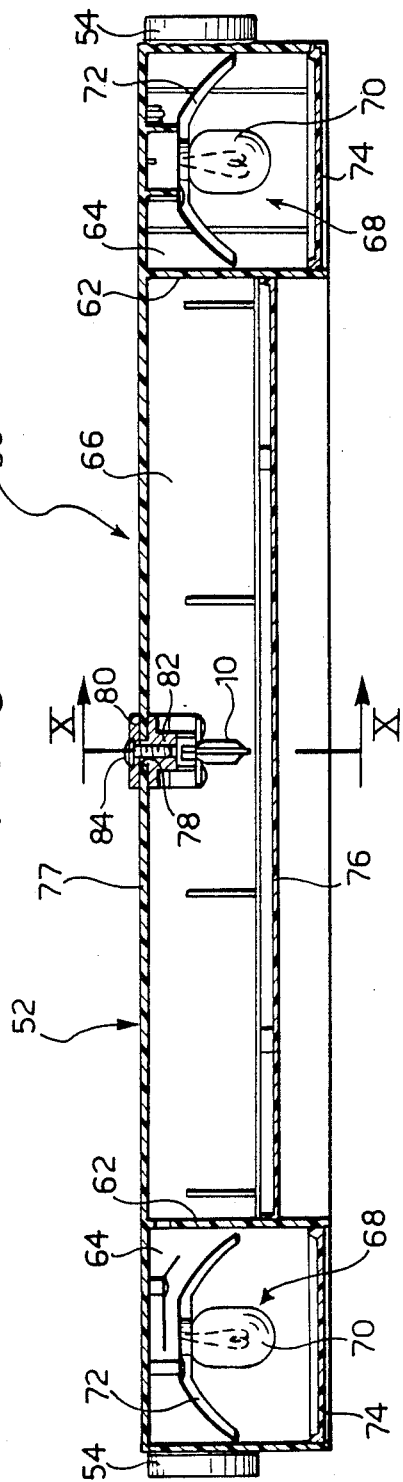

MERCURY INERTIAL TRANSDUCER AND LIGHT-EMITTING INDICATOR FOR MOTOR VEHICLES

The present invention relates in the first place to a mercury inertial transducer and to a unit including such a transducer.

A transducer is known from the document U.S.-A-No.3,973,092. In this known transducer, an input electrode extends into the lower arm from below and penetrates a certain distance into the ascending arm. The output electrode means are constituted by a single electrode which extends into the ascending arm from above, terminating a short distance from the input electrode. The transducer is therefore only a mercury switch which closes when the acceleration to which it is subject reaches a predetermined threshold. This known transducer is therefore only able to provide a single electrical signal starting at a given acceleration threshold.

In the specific application described in the document U.S.-A-No.3,973,092, the transducer is intended for controlling a pneumatic anti-collision cushion in a motor vehicle, but could also be used to provide a luminous indication of a positive or negative acceleration.

A first object of the invention is to produce a compact transducer, based on the principle of the document U.S.-A-No.3,973,092, which could usefully be applied whenever there is a need to obtain electrical signals in order to display distinct positive or negative acceleration values, or to control a device in dependence on these signals.

In a transducer according to the invention, as the degree of positive or negative acceleration increases, the mercury rises to higher levels in the ascending arm to establish electrical contact between the input electrode and an increasing number of output electrodes.

The invention also relates to a unit including a transducer according to the invention.

In this unit, the possibility of adjustment of the inclination of the transducer enables easy calibration of the various positive or negative acceleration thresholds at which electrical contact is established between the input electrode and the succession of output electrodes.

The invention also concerns a light-emitting deceleration and stopping indicator for motor vehicles.

An indicator is known from the document U.S.-A-No.3,019,145. The indicator according to this document includes an elongate hollow body for installation at the rear of a motor vehicle body, which contains a row of flashing light units. As the pressure in the braking system of the motor vehicle increases, increasing numbers of these light units receive a supply by means of an electrohydraulic transducer which is sensitive to the pressure in the system. The indicator according to the document U.S.-A-No.3,019,145 cannot be produced as a compact unit, since its transducer must be located remote from the body which contains the light units. Moreover, the hydraulic connection of the transducer to the braking system requires the services of an expert.

Brake-light repeaters or so-called anti-collision lights have been used for some years, particularly in the Unites States of America, and consist of a lamp which is mounted in a high position, for example, inside the rear window of a motor car, and includes a bulb connected in parallel with the normal brake lights of the motor vehicle. Indicators of this type are very useful when lines of vehicles are travelling close together, whereby the bonnet of a following vehicle prevents its driver from seeing the normal brake lights of the vehicle in front.

An example of this is the repeater known from the document U.S.-A-No.4,575,782. This repeater is a compact unit which is easy to install and to connect electrically, even by a relatively unskilled person.

The object of the present invention is to provide a light-emitting deceleration and stopping indicator which fulfils the functions of known indicators, which is constituted by a compact unit, and which can be installed and connected electrically even by a relatively unskilled person, like the indicator of the document U.S.-A-No.4,575,782.

By virtue of this concept and particularly by virtue of the fact that the transducer according to the invention is housed in the body of the indicator, a compact unit is obtained whose installation and electrical connection are just as easy as those of the repeater according to the document U.S.-A-No.575,782, as will be better understood from the description with reference to the drawings.

As indicator of the type in question is known from the document U.S.-A-No.3,528,056, the transducer of which is constituted by a plurality of separate mercury switches each arranged at a different inclination to the horizontal. In this indicator, which is intended to make the normal brake lights of a motor vehicle flash at a variable frequency, the mounting of the various mercury switches is complicated by the need to adjust their inclinations individually, and the wiring necessary for connection of the switches is relatively complicated and expensive.

A light-emitting deceleration and stopping indicator is known from the document U.S.-A-No.3,710,315, in which the transducer is constituted by a centrifugal electromechanical distributor which is sensitive to the speed of the vehicle and which causes the illumination of a greater number oif brake lights and more the speed of the vehicle decreases when the brake pedal is operated.

The document German Pat. No. 696,489 also describes a light-emitting deceleration and stopping indicator in which a centrifugal electromechanical transducer serves to make the normal brake lights of a vehicle flash during braking and before the vehicle has completely stopped.

Another example of a light-emitting deceleration and stopping indicator is known from the document DE-D-No.1,234,553, which includes an electromechanical transducer sensitive to the position of the brake pedal.

None of these indicators lends itself to the production of a compact unit and at least the installation of their electromechanical transducers requires services of an expert fitter.

The invention will be more clearly understood from a reading of the description which follows with reference to the appended drawings illustrating its preferred embodiments, given by way of non-limiting example, and in which:

FIG. 1 is a perspective view of a mercury inertial transducer according to the invention, FIG. 2 is a longitudinal section thereof taken in the median plane indicated II—II in FIG. 1, FIG. 3 is an exploded perspective view thereof, FIG. 4 is a cross-section thereof taken in the plane indicated IV—IV in FIG. 2.

FIG. 5 is a perspective view of a light-emitting deceleration and stopping indicator according to the invention, FIG. 6 is a rear view of a motor car, showing possible positions of installation of the indicator, FIG. 7 is a side elevational view of the indicator, in which part of the window and part of the parcel shelf of the motor car are shown in longitudinal section.

FIG. 8 is a front elevational view of the indicator,

FIG. 9 is a horizontal section thereof taken in the plane indicated IX—IX in FIG. 8, FIG. 10 is a cross-section taken in the plane indicated X—X in FIG. 9.

Figure 11:
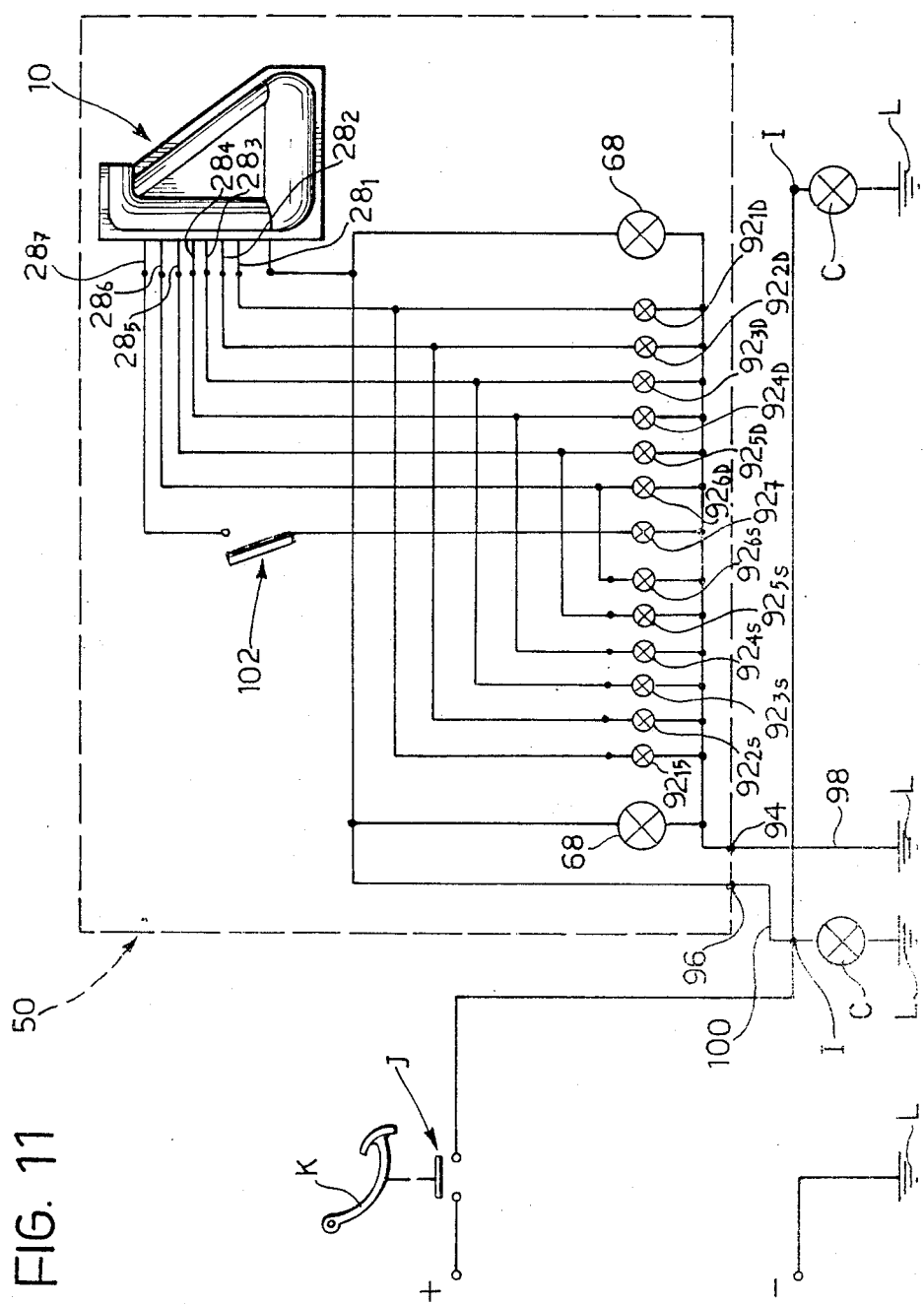
FIG. 11 is an electrical diagram of the indicator and of its connection to the electrical system of a motor vehicle.

With reference to FIGS. 1 to 4, the transducer, generally indicated 10, includes a casing 12. The casing 12 is constituted by a pair of mirror-imaged half-casings 12a, 12b, for example, of rigid moulded plastics material. The two half-casings 12a and 12b are in the form of essentially triangular or trapezoidal plates and mate at flat faces 14a, 14b which are joined together by glueing or ultrasonic welding. Recesses are formed by moulding in the mating faces 14a, 14b of each of the half-casings 12a and 12b and, when the half-casings are joined together, form an essentially L-shaped cavity in the casing 12. Respective protrusions on the outside of the two half-casings 12a, 12b correspond to these recesses. For simplicity, the various parts of the cavity, the recesses which define them, and the corresponding protrusions are indicated by the same reference numerals.

The cavity of the casing 12 includes, with reference to its position of use, substantially horizontal lower arm 16 and a substantially vertical ascending arm 18. The lower arm 16 is relatively large section and in the rest condition contains a volume of mercury A, as illustrated in FIG. 2. This volume of mercury essentially does not occupy the ascending arm 18.

The charge of mercury A is introduced into the casing 12 through a threaded hole 20. A protective gas, for example nitrogen, is preferably introduced into the cavity through the samme hole 20 and occupies the part of the cavity not occupied by the mercury. The hole 20 is closed hermetically by a threaded plug 22.

The cavity of the casing 12 also includes a third arm 24 which interconnects the remote ends of the lower arm 16 and the upper arm 18.

The transducer includes an input electrode 26 and a series of output electrodes $28_1$, $28_2$, $28_3$, $28_4$, $28_5$, $28_6$, $28_7$. The input electrode 26 is produced by the blanking and bending of a piece of sheet metal. It comprises a blade part 30 which projects like a pin from the casing 12 on the outer side of the ascending arm 18 and is permanently immersed in the mercury A. The blade part 30 is extended within the ascending arm 18 by an enlarged appendage 32 which is curved like a tile and is applied against the wall of the ascending arm 18 on its inside.

The output electrodes $28_1 \ldots 28_7$ are all constituted by blades of the same sheet metal as the input electrode 26.

Both the blade part 30 of the input electrode 26 and the blades $28_1 \ldots 28_7$ penetrate the cavity of the casing 12 between teh two mating faces 14a and 14b. Facing notches 34 are formed in these faces 14a, 14b for the passage of the electrodes. In correspondence with these notches, the input electrode 26 has a narrow part 36 and the electrodes $28_1 \ldots 28_7$ have narrow parts 38. These narrow parts 36 and 38 are fitted into the paired notches 34 to anchor the electrodes firmly.

As can be seen, the outer parts 40 of the output electrodes $28_1 \ldots 28_7$ are aligned like a comb and project like pins from the casing 12 along the outer side os the ascneding arm 18 for coupling, together with the blade part 30 of the input electrode 26, to a common female connector.

Naturally, the electrodes could be arranged differently, but their preferred arrangement is that illustrated. They could, for example, be constituted by rod-shaped elements of round section instead of by blades.

As can be seen, the inner ends of the output electrodes $28_1 \ldots 28_7$, indicated 42, face the tile-shaped appendage 32 of the input electrode 26.

For use, the transducer 10 is intended to be fixed to a support, one embodiment of which will be described below. For its fixing, the transducer 10 includes a pair of opposing flanges or lugs 44. Each of these flanges 44 is produced by moulding with a respective half casing 12a, 12b. The flanges 44 extend at right angles to the general plane of the respective half-casing and are flush with that edge of the half-casing which corresponds to the outer side of the ascending arm 18. Each flange 44 has a slot 46 for the passage of the shank of a fixing screw.

The plastics material of the casing 12 is preferably transparent to enable the correct functioning of the transducer to be checked.

The operation of the transducer 10 will now be described.

In FIGS. 1 and 2, the arrows B indicate the path and direction of motion of a movable object on which the transducer 10 is mounted with its lower arm 16 substantially horizontal and its ascending arm 18 substantially vertical. In these conditions, the transducer is sensitive to inertial forces directed along the lower arm 16 and towards the ascending arm 18.

When the movable object, for example, a motor vehicle, is stationary or moving at a constant speed along a horizontal path B, all be mercury A is situated in the lower arm 16 and only the input electrode 26 is immersed therein.

When the movable object decelerates, the mercury A is displaced forwardly (towards the left in FIG. 2) and rises in the ascending arm 18 of the cavity. The greater the degree of deceleration, the higher the level the mercury A reaches in the ascending arm 18. The mercury therefore establishes electrical contact between the input electrode 26 and a number of output electrodes $28_1 \ldots 28_7$ which increases as the degree of deceleration increases.

To give an idea, the volume of mercury A, the sections of the arms 16 and 18, and the heights of the output electrodes $28_1 \ldots 28_7$ may be calculated so that contact with the successive electrodes $28_1 \ldots 28_7$ takes place in steps of 0.1 g.

A good electrical contact along the shortest and thus least resistive path through the mercury is ensured by the presece of the appendage 32 which faces the ends 42 of the output electrodes.

The third arm 24, which is preferably of smaller section than the other two arms 16 and 18 and therefore restricted, enables the gas to circulate according to the movements of the mercury A, with a certain damping effect to make the transducer 10 relatively insensitive to negative or positive accelerations of brief duration.

Alternatively, the damping could be made adjustable by the extension of the screw plug 22 so that it obstructs the corresponding opening in the third arm 24 to a greater or lesser extent.

As will be understood, the establishing of the connection between the input electrode 26 and successive output electrodes $28_1 \ldots 28_7$ may be used to obtain electrical signals in order to display distinct negative (or positive) acceleration values, or in order to control a device in dependence on these signals.

The transducer 10 may usefully be applied to a light-emitting deceleration and stopping indicator for motor vehicles.

This indicator will now be described with reference to FIGS. 5 to 11.

With reference first of all to FIGS. 5, 8, 9 and 10, the indicator 50 includes an elongate hollow body or case 52 of moulded plastics material. The body 52 is provided with means for fixing to a relatively high rear part of the bodywork of a motor vehicle. As shown, the fixing means preferably include a pair of legs 54 of the same plastics material as the body 52. The legs 54 are articulated to the body 52 near their ends which are uppermost in the drawings, by means of screws 56. Fixing feet 58 of the same plastics material are associated with the legs 54. The feet 58 are articulated to the legs 54 near the ends thereof which are lowermost in the drawings, by means of screws 60.

The body 52 is in the shape of a recumbent elongate box and has an open side which, as will be seen, faces rearwardly in its position of use.

The body 52 also has transverse walls 62 produced by moulding, which divide it into two opposite end compartments 64 and a long central compartment 66.

Respective optical or light units 68, each having, for example, an incandescent bulb 70 and its parabolic reflector 72, are mounted in the end compartments 64.

The compartments 64 are closed by respective transparent, red dioptric screens or plates 74 which are inserted with a tight fit.

A panel 76 is fitted in the central compartment 66 and, as will be described below, in the embodiment illustrated carries a plurality of light-emitting diodes (LEDs).

The indicator 50 is mounted as illustrated in FIGS. 6 and 7. FIG. 6 shows a motor car seen from behind. Its normal brake or "stop" lights are indicated C. The indicator 50 is mounted (FIG. 7) on the parcel shelf D in front of the rear window E. Alternatively, as illustrated in broken outline at 50a in FIG. 6, the indicator may be mounted upside down near the top of the frame of the window E.

Once the most convenient or necessary position of fixing of the feet 58 to the parcel shelf D or to something else has been selected, the casing 52 can be arranged in the most convenient position nearer to or further from the window E, by virtue of its articulation about the horizontal transverse axis defined by the screws 60, as indicated by the double-ended arrow F in FIG. 7. Thus, it is also possible to regulate the horizontal position or any inclination of the body 52, as indicated by the double-ended arrow G in FIG. 7, by virtue of the articulation about the horizontal transverse axis defined by the screws 56.

Once the adjustments according to the arrows F and G have been made, the indicator 50 can be clamped permanently in the desired configuration simply by the tightening of the screws 56 and 60.

A transducer 10 such as that in FIGS. 1 to 4 is mounted in the central compartment 66. The transducer 10 is supported by the body 52 so that its lower arm 16 is substantially horizontal and its ascending arm 18 is situated forwardly with respect to the direction of travel, again indicated B in FIG. 10.

As shown in FIG. 10, the casing 52 has a semi-cylindrical front wall 77 (with respect to the direction of travel) with a horizontal axis. In correspondence with the middle of the central compartment 66, this front wall 77 has a circumferential slot 78. Means for fixing the transducer 10 are provided in correspondence with the slot 78 and comprise a pair of arcuate tile-shaped members. One of these, indicated 80, is fitted to the outer surface of the wall 77. The other tile-shaped member, indicated 82, is fitted to the inner surface of the wall 77. The two tile-shaped members 80 adn 82 are interconnected by a screw 84 whose shank passes through the slot 78. The screw 84 is screwed into a metal insert 86 which acts as a nut and is countersunk in the plate 82.

The transducer 10 is fixed to the inner plate 82 by means of screws 86 whose shanks pass through the slots 46 (FIGS. 1 to 3) in its flanges or lugs 44. Between the flanges 44 and the plate 82, the shanks of the screws 86 are surrounded by tubular spacers 88 which leave a space between the plate 82 and the transducer 10 for a multipolar female connector 90 connected to all the pins 30, 40 of the electrodes 26, $28_1 \ldots 28_7$.

The means for fixing the transducer 10 to its support formed by the casing 52, which are constituted by the two tile-shaped members 80, 82 and their connecting screws 84, enable the attitude of the transducer 10 to be adjusted, with the screw 84 slackened, in the direction of the double-ended arrow H in FIG. 10. This attitude adjustment enables the inclination of the lower arm 16 to the horizontal and the inclination of the ascending arm 18 to the vertical to be adjusted to make the transducer less or more sensitive to the deceleration forces. Once the desired sensitivity has been achieved, the setting of the attitude of the transducer 10 is made permanent by the tightening of the screw 84. Thus, by the same adjustment, it is also possible to reset the horizontal position or most convenient inclination of the lower arm 16, if the body 52 is not horizontal as a result of the adjustments in the directions of the arrows of FIG. 7.

With reference to FIGS. 5 to 8, the panel 76 carries an array of light units, each of which is preferably constituted by a set of light-emitting diodes (LEDs). This array is divided into left- and right-hand half-arrays, plus a central unit. The respective light units of the two half-arrays are indicated $92_{1S} \ldots 92_{6S}$ for the left-hand one and $92_{1D} \ldots 92_{6D}$ for the right-hand one. The central light unit is indicated $92_7$. In the embodiment illustrated, each light unit of each half-array comprises five LEDs arranged so as to form a pattern of dotted arrows pointing towards the central unit $92_7$. In the embodiment illustrated, the central light unit $92_7$ comprises eight LEDs arranged in a diamond pattern.

The diodes of the units $92_{1S} \ldots 92_{6S}$ and $92_{1D} \ldots 92_{6D}$ emit red light, whilst those of the central unit $92_7$ emit orange light.

The entire indicator 52 can be connected electrically to the electrical system of the motor vehicle by means of only tow terminals 94 and 96 (FIG. 8) housed on one of the feet 85 (the left-hand one in FIG. 8). One of these terminals, for example 94, is intended to be connected by a lead to earth, which is constituted by the metal bodywork of the motor vehicle. The lead may, for example, be connected to a screw in the bodywork by means of an eyelet terminal.

The other terminal, for example 96, is intended to be connected in parallel with the brake lights C of FIG. 6. For example, a lead may connect the terminal 96 to the corresponding non-earth terminal (normally positive) of one of the brake lights C. The electrical circuit incorporated in the body 52 of the indicator 50 is illustrated in FIG. 11, to which reference will now be made.

The normal brake lights of the vehicle are again indicated C. The positive pole of the battery is indicated "+" and is connected to the terminals I of the brake lights C through the normal switch J associated with the brake pedal K. The earth of the bodywork is indicated L and is connected to the negative pole, indicated "−", of the battery.

The terminal 94 is also connected to the earth L through a lead 98. The other terminal 96 is connected to one of the terminals I of the brake lights C through a lead 100.

The two lights 68 are interconnected in parallel with each other and are also connected directly in parallel with the brake lights C through the terminal 96 and the lead 100.

The terminal 96 is connected directly to the input electrode 26 of the transducer 10.

The outermost light units $92_{1S}$ and $92_{1D}$ of each half-array are electrically in parallel with each other and connected to the bottom output electrode $28_1$ of the transducer 10. Progressively more inward pairs of units $92_{2S}...92_{6S}, 92_{2D}...92_{6D}$ of the two half-arrays are electrically in parallel with each other and connected to progressively higher output electrodes $28_2...28_6$ of the transducer 10. The central unit $92_7$ is connected to the top output electrode $92_7$ of the transducer. A flasher is preferably interposed electrically between the top output electrode $92_7$ and the central light unit $92_7$ and mounted in the body 52 of the indicator 50. This flasher has been represented symbolically in FIG. 11 as a bimetal switch 102.

The circuit of FIG. 11, which is housed in the body 52, may for the most part be a printed circuit carried on the back of the panel 76.

The resistors through which the LEDs are connected to the output electrodes and which may be carried by the printed circuit have not been shown in FIG. 11 for simplicity.

The use of LEDs is convenient both for their cheapness and their low current consumption. Amongst other things, the low curret consumption has the advantage that it enables a small transducer 10 to be used and at the same time enables the formation of electric arcs between the output electrodes $28_1...28_7$ and the mercury A to be avoided.

The LEDS, however, have the disadvantage that they emit light in a beam of limited spread. From this point of view, the adjustablility of the attitude of the body 52 in the direction of the double-ended arrow G of FIG. 7 is convenient, since it enables the optical axes of the beams emitted by the LEDs of the light units to be directed to the height of the eyes of the driver of a motor car which is following the car provided with the indicator 50 at a distance of 10–20 m.

The operation of the indicator is as follows.

When the driver brakes lightly with the pedal K, the normal brake lights C and the red lights 68, which act as repeaters, are switched on.

When the driver brakes a little more energetically, so as to make the vehicle achieve a deceleration of 0.1 g, the mercury reaches the bottom output electrode $28_1$ and the outermost light units $92_{1S}, 91_{1D}$ are switched on. With even more energetic braking, such as to achieve 0.2 g, for example, the mercury reaches the immediately higher output electrode $28_2$ and the immediately inward pair of light units $92_{2S}, 92_{2D}$ are switched on, and so on.

As the deceleration increases the driver of a following vehicle sees fixed red arrow patterns which get closer and closer together, and the ever closer points thereof give the impression of a decrease in distance from the preceding vehicle.

When, upon extremely sharp braking, for exmaple, to 0.7 g, the mercury reaches the highest output electrode $28_7$, the central unit $92_7$ flashes with an orange light, giving the driver of the following vehicle a sense of danger.

What is claimed is:

1. A mercury inertial transducer comprising:
   a casing which defines a substantially L-shaped cavity with a substantially horizontal lower arm and a substantially vertical ascending arm, with reference to its position of use;
   a volume of mercury which, in a rest condition, occupies the lower arm and essentially does not occupy the ascending arm;
   an input electrode which penetrates the lower arm from the outside and is permanently immersed in the mercury, and
   output electrode means which penetrate the ascending arm from the outside and can be reached by the mercury when the mercury rises in the ascending arm due to an inertial force directed along the lower arm and towards the ascending arm,
   wherein the output electrode means are constituted by a series of separate output electrodes which are spaced along the ascending arm and can be reached in succession by the mercury and
   wherein said transducer includes a support which can be fixed to a movable object, such as a motor vehicle, and on which the transducer is mounted so as to enable the adjustment of the inclination of its lower arm to the horizontal and of its ascending arm to the vertical.

2. A transducer according to claim 1, wherein the cavity of the casing is closed hermetically and the part thereof which is not occupied by the mercury contains a gas, and wherein the cavity includes a third arm which interconnects the remote ends of the lower arm and the ascending arm and enables the gas to circulate as a result of the movement of the mercury.

3. A transducer according to claim 2, wherein the third arm has a section such that it restricts the passage of the gas in order to damp the movements of the mercury.

4. A transducer according to claim 1, wherein the casing is constituted by two half-casings which mate and are joined in a common median plane of the arms of the cavity, and wherein the electrodes are constituted by rod-shaped metal elements which are pinched and anchored between the half-casings in the median plane.

5. A transducer according to claim 4, wherein the rod-shaped elements are aligned like teeth in a comb and project like pine from the casing along the outer side of the ascending arm so that they can be coupled to a common female connector.

6. A tranasducer according to claim 5, wherein the pins are in the form of coplanar blades.

7. A transducer according to claim 5, wherein the input electrode includes, within the casing, an appendage which extends into the ascending arm and faces the inner ends of the output electrodes.

8. A transducer according to claim 1, wherein the casing includes flanges for fixing to a support.

9. A transducer according to claim 1, wherein the casing is of moulded plastics material.

10. A transducer according to claim 9, wherein the casing is of transparent plastics material.

11. A light-emitting deceleration and stopping indicator for motor vehicles, comprising an elongate hollow body provided with means for fixing to a relatively high rear part of the bodywork of the vehicle, the hollow body carrying an array of electric light units which are spaced along its length, are aligned transversely of the vehicle and face rearwardly with respect to its direction of travel when the indicator is installed, and are intended to be connected electrically to the electrical system of the vehicle through the switch of the normal brake lights associated with the brake pedal, as well as through electrical distribution means which are sensitive to the degree of braking and cause lighting of an increasing number of light units as the degree of braking increases, a mercury inertial transducer comprising:

a casing which defines a substantially L-shaped cavity with a substantially horizontal lower arm and a substantially vertical ascending arm, with reference to its position of use;

a volume of mercury which, in A rest condition, occupies the lower arm and essentially does not occupy the ascending arm;

an input electrode which penetrates the lower arm from the outside and is permanently immersed in the mercury, and output electrode means which penetrate the ascending arm from the outside and can be reached by the mercury when the mercury rises in the ascending arm due to an inertial force directed along the lower arm and towards the ascending arm, wherein the output electrode means are constituted by a series of separate output electrodes which are spaced along the ascending arm and can be reached in succession by the mercury, wherein said inertial transducer is mounted in the hollow body and is arranged, when the indicator is installed, with its lower arm substantially horizontal and its ascending arm in front with respect to the direction of travel, and wherein the output electrodes of the transducer are each connected to at least one of the light units and wherein the transcducer is supported in the hollow body by fixing means which enable the inclination of the lower arm of the transducer to the horizontal and the inclination of its ascending arm to the vertical to be adjusted.

12. A light-emitting indicator according to claim 11, wherein theh light units are divided into left-hand and a right-hand half-arrays and a cetnral light unit, in which the outermost units of each of the two half-arrays are electrically in parallel with each other and connected to the lower output electrode of the transducer, progressively more inward pairs of units of the two half-arrays being electrically in parallel with each other and connected to progressively higher output electrodes of the transducer and the central unit being connected to the top output electrode of the transducer.

13. A light-emitting indicator according to claim 12, wherein a flasher is mounted in the hollow body and is interposed electrically between the central light unit and the top output contact of the transducer to make this central unit emit flashing light.

14. A light-emitting indicator according to claim 12, wherein each light unit is constituted by a set of light-emitting diodes (LEDs).

15. A light-emitting indicator according to claim 14, wherein the light-emitting diodes of each half-array emit red light.

16. A light-emitting indicator according to claim 14, wherein the light-emitting diodes of each unit of the two half-arrays are arranged so as to form a pattern of dotted arrows pointing towards the central unit.

17. A light-emitting indicator according to claim 14, wherein the light-emitting diodes of the central unit emit orange light.

18. A light-emitting indicator according to claim 14, wherein the light-emitting diodes of the central unit are arranged in a diamond pattern.

19. A light-emitting indicator according to claim 12, wherein the hollow body also carries, beside the outer end of each half-array, a red light for electrical connection in parallel with the brake lights of the motor vehicle

20. A light-emitting indicator according to claim 11, wherein the hollow body has a cylindrical front wall having a horizontal axis and defining a circumferential slot, and wherein the fixing means comprise a pair of tile-shaped members, one of which is fitted to the outer surface and the other of which is fitted to the inner surface of the cylindrical wall and carries the transducer, and a screw whose shank passes through the slot and interconnects the two tile-shaped members so that they grip the cylindrical wall.

21. A light-emitting indicator according to claim 11, wherein the means for fixing the hollow body to the bodywork are such as to enable angular adjustment about at least one horizontal axis transverse the direction of travel, for adjustment of the attitude of the optical axes of the light units to the horizontal.

22. A light-emitting indicator according to claim 21, wherein the fixing means comprise a pair of legs having ends which are articulated in a lockable manner to the two ends of the body about a first horizontal axis transverse the direction of travel, and respective feet for fixing to the bodywork and articulated in a lockable manner to the other ends of the legs about a second axis parallel to the first.

* * * * *